(12) United States Patent
Diederich et al.

(10) Patent No.: US 11,397,312 B2
(45) Date of Patent: Jul. 26, 2022

(54) STRUCTURED ILLUMINATION WITH OPTIMIZED ILLUMINATION GEOMETRY

(71) Applicant: Carl Zeiss Microscopy GmbH, Jena (DE)

(72) Inventors: Benedict Diederich, Jena (DE); Rolf Wartmann, Waake (DE); Harald Schadwinkel, Hannover (DE); Lars Stoppe, Jena (DE)

(73) Assignee: Cad Zeiss Microscopy GmbH, Jena (DE)

(*) Notice: Subject to any disclaimer, the term of this patent is extended or adjusted under 35 U.S.C. 154(b) by 149 days.

(21) Appl. No.: 16/498,639

(22) PCT Filed: Mar. 2, 2018

(86) PCT No.: PCT/EP2018/055157
§ 371 (c)(1),
(2) Date: Sep. 27, 2019

(87) PCT Pub. No.: WO2018/177680
PCT Pub. Date: Oct. 4, 2018

(65) Prior Publication Data
US 2020/0264419 A1 Aug. 20, 2020

(30) Foreign Application Priority Data
Mar. 31, 2017 (DE) .................. 10 2017 106 984.4

(51) Int. Cl.
*G02B 21/14* (2006.01)
*G01N 21/41* (2006.01)
*G02B 21/08* (2006.01)

(52) U.S. Cl.
CPC ............ *G02B 21/14* (2013.01); *G01N 21/41* (2013.01); *G02B 21/082* (2013.01); *G01N 2021/418* (2013.01); *G01N 2021/4186* (2013.01)

(58) Field of Classification Search
CPC ...... G01B 11/2513; G06T 2207/10056; G06T 7/001; G02B 21/14; G02B 21/082;
(Continued)

(56) References Cited

U.S. PATENT DOCUMENTS 6,243,197 B1 6/2001 Schalz
9,007,454 B2 4/2015 La Lumondiere et al.
(Continued)

FOREIGN PATENT DOCUMENTS

CN 102299037 A 12/2011
CN 103492926 A 1/2014
(Continued)

OTHER PUBLICATIONS

"Examination Report and English language translation", DE Application No. 10 2017 106 984.4, dated Jul. 15, 2021, 18 pp.
(Continued)

*Primary Examiner* — Hoa Q Pham
(74) *Attorney, Agent, or Firm* — Myers Bigel, P.A.

(57) ABSTRACT

An object transfer function for a sample object is determined on the basis of a reference measurement. Subsequently, an optimization is carried out in order to find an optimized illumination geometry on the basis of the object transfer function and an optical transfer function for an optical unit.

10 Claims, 9 Drawing Sheets

(58) Field of Classification Search
CPC ...... G02B 21/367; G02B 27/52; G01N 21/41; G01N 21/4795; G01N 21/6456; G01N 2021/418; G01N 2021/4186
USPC ......... 356/124–127; 359/362, 385, 388–390; 348/79
See application file for complete search history.

(56) References Cited

U.S. PATENT DOCUMENTS

| | | | |
|---|---|---|---|
| 10,228,554 | B2* | 3/2019 | Waller ............... G02B 27/0012 |
| 2003/0184757 | A1 | 10/2003 | Bevilacqua et al. |
| 2004/0246479 | A1 | 12/2004 | Cartlidge et al. |
| 2004/0265707 | A1 | 12/2004 | Socha |
| 2006/0184043 | A1 | 8/2006 | Tromberg et al. |
| 2010/0135569 | A1 | 6/2010 | Berger |
| 2011/0075124 | A1 | 3/2011 | Socha |
| 2012/0099172 | A1 | 4/2012 | Ohki |
| 2012/0257040 | A1 | 10/2012 | Koebler et al. |
| 2012/0262562 | A1 | 10/2012 | Fukutake et al. |
| 2013/0070251 | A1 | 3/2013 | Das et al. |
| 2013/0258090 | A1 | 10/2013 | Steinmeyer et al. |
| 2014/0118525 | A1 | 5/2014 | Hegg et al. |
| 2014/0118531 | A1 | 5/2014 | Franklin et al. |
| 2014/0118561 | A1* | 5/2014 | La Lumondiere .......................... G01N 21/9505 348/207.1 |
| 2014/0126691 | A1 | 5/2014 | Zheng et al. |
| 2017/0085760 | A1* | 3/2017 | Ernst .................. G06T 7/001 |
| 2017/0262968 | A1 | 9/2017 | Stoppe et al. |
| 2019/0219811 | A1* | 7/2019 | Keller ................ G02B 21/0032 |

FOREIGN PATENT DOCUMENTS

| | | |
|---|---|---|
| CN | 103534629 A | 1/2014 |
| CN | 104068875 A | 10/2014 |
| CN | 104797970 A | 7/2015 |
| CN | 104865276 A | 8/2015 |
| CN | 104936439 A | 9/2015 |
| CN | 105319695 A | 2/2016 |
| DE | 102013003900 A1 | 10/2013 |
| DE | 10 2014 112 242 A1 | 3/2016 |
| DE | 102014113258 A1 | 3/2016 |
| DE | 10 2015 218 917 A1 | 3/2017 |
| WO | 02099502 A1 | 12/2002 |
| WO | 2014/127986 A1 | 8/2014 |
| WO | 2015/179452 A1 | 11/2015 |

OTHER PUBLICATIONS

"First Office Action and English language translation", CN Application No. 201880019069.5, dated Apr. 6, 2021, 8 pp.
Tian, Lei, et al., "Quantitative differential phase contrast imaging in an LED array microscope", Optics Express, vol. 23, No. 9, Apr. 4, 2015, 11394-11403.
Bian, Masters Theses—"The Applications of Low-cost Liquid Crystal Display for Light Field Modulation and Multimodal Microscopy Imaging" (https://opencommons.uconn.edu/gs_theses/746), May 1, 2015, 39 PP.
Diederich et al., "Using Machine-Learning to Optimize Phase-Contrast in a Low-Cost Cellphone Microscope", PLoS ONE, 13(3), Mar. 1, 2018, 17 pp.
Garetto et al., "Aerial imaging technology for photomask qualification: from a microscope to a metrology tool", Advanced Optical Technologies, vol. 1, No. 4, Sep. 8, 2012, pp. 289-298.
Iglesias et al., "Quantitative phase microscopy of transparent samples using a liquid crystal display", Journal of Biomedical Optics, vol. 18, No. 2, Feb. 2013, pp. 026015-1 -026015-5.
Jia et al., "Pixelated source mask optimization for process robustness in optical lithography", Optics Express, vol. 19, No. 20, Sep. 26, 2011, pp. 19384-19398.
Tian et al., "Quantitative differential phase contrast imaging in an LED array microscope", Optics Express, vol. 23, No. 9, May 4, 2015, pp. 11394-11403.
Wilson et al., "Theory And Practice Of Scanning Optical Microscopy", Chapters 1-5, Oct. 1984, 74 pp.
Wu et al., "Efficient source mask optimization with Zernike polynomial functions for source representation", Optics Express, vol. 22, No. 4, Feb. 24, 2014, pp. 3924-3937.
Yamazoe et al., "Aerial image back propagation with two-dimensional transmission cross coefficient", Journal of Micro/Nanolithography, MEMS, and MOEMS, vol. 8, No. 3, Jul.-Sep. 2009, pp. 031406-1-031406-7.
Yu et al., "Gradient-Based Fast Source Mask Optimization (SMO)", Proc. SPIE, vol. 7973, Optical Microlithography XXIV, Mar. 22, 2011, 797320-1-797320-13.
Han et al., "Resonant-enhanced full-color emission of quantum-dot-based micro LED display technology", Optics Express, vol. 23, No. 25, Dec. 14, 2015, pp. 32504-32515.
Guo et al., "Optimization of sampling patterns and the design of Fourier ptychographic illuminator", Optics Express, vol. 23, No. 5, Mar. 9, 2015, pp. 6171-6180.
Orieux et al., "Bayesian Estimation for Optimized Structured Illumination Microscopy", IEEE Transactions on Image Processing, vol. 21, No. 2, Feb. 2012, pp. 601-614.
Tian et al., "Computational Microscopy: Illumination Coding and Nonlinear Optimization Enables Gigapixel 3D Phase Imaging", 2017 IEEE International Conference on Acoustics, Speech and Signal Processing (ICASSP), New Orleans, LA, Mar. 5-9, 2017, pp. 6225-6229.
International Search Report and Written Opinion of the International Searching Authority, International Application No. PCT/EP2018/055157, dated Nov. 2, 2018, 23 pp.
Guo et al., "Optimization of Sampling pattern and the design of Fourier ptychographic illuminator", Optics Express, vol. 23, No. 5, Mar. 9, 2015, pp. 6171-6180.
Hopkins, "On the Diffraction Theory of Optical Images", Proceedings of the Royal Society of London. Series A, Mathematical and Physical Sciences, vol. 217, No. 1130, May 7, 1953, pp. 408-432.
Krizhevsky et al., "ImageNet Classification with Deep Convolutional Neural Networks", Communications of the ACM, vol. 60, No. 6, Jun. 2017, pp. 84-90.
Lawrence et al., "Face Recognition: A Convolutional Neural-Network Approach", IEEE Transactions on Neural Networks, vol. 8, No. 1, Jan. 1997, pp. 98-113.
Litjens et al., "A Survey on Deep Learning in Medical Image Analysis", arxiv.org, Cornell University Library, Feb. 19, 2017, 34 pp (XP080747655).
Simard et al., "Best Practices for Convolutional Neural Networks Applied to Visual Document Analysis", Proceedings of the Seventh International Conference on Document Analysis and Recognition (ICDAR'03), Edinburgh, Scotland, UK, Aug. 3-6, 2003, 6 pp.
Sommer et al., "Machine learning in cell biology—teaching computers to recognize phenotypes", Journal of Cell Science, vol. 126, 2013, pp. 5529-5539.
Tian et al., "Computational Microscopy: Illumination Coding and Nonlinear Optimization Enables Gigapixel 3D Phase Imaging", 2017 IEEE International Conference on Acoustics, Speech and Signal Processing (ICASSP 2017, New Orleans, USA, Mar. 5-9, 2017, pp. 6225-6229.
Tian et al., "Quantitative differential phase contrast imaging in an LED array microscope", Optics Express, vol. 23, No. 9, May 4, 2015, pp. 11394-11401.
"Second Office Action and English language translation", CN Application No. 201880019069.5, dated Dec. 3, 2021, 6 pp.

* cited by examiner

Carrying out a reference measurement
in order to determine the object transfer function

STRUCTURED ILLUMINATION WITH OPTIMIZED ILLUMINATION GEOMETRY

CROSS REFERENCE TO RELATED APPLICATIONS

This application is a 35 U.S.C. § 371 national stage application of PCT International Application No. PCT/EP2018/055157, filed on Mar. 2, 2018, which itself claims the benefit of and priority to German Application No. 10 2017 106 984.4, filed Mar. 31, 2017, the disclosure and content of both of which are incorporated by reference herein in their entireties.

TECHNICAL FIELD

Various techniques for phase contrast imaging are known, for instance dark-field illumination, oblique illumination, differential interference contrast (DIC) or else Zernike phase contrast.

BACKGROUND

In the optical imaging of sample objects, it may often be worthwhile to generate a so-called phase contrast image of the sample object. In a phase contrast image, at least some of the image contrast is caused by a phase shift of the light through the imaged sample object. In particular, this allows those sample objects that cause no attenuation or only a small attenuation of the amplitude but a significant phase shift to be imaged with a comparatively high contrast; often, such sample objects are also referred to as phase objects. Biological samples as sample object in a microscope may typically bring about a comparatively larger change in phase than change in amplitude of the electromagnetic field.

Various techniques for phase contrast imaging are, for instance dark-field illumination, oblique illumination, differential interference contrast (DIC) or else Zernike phase contrast.

Such techniques mentioned above have various disadvantages or limitations. Often, it may be necessary to provide additional optical elements between sample and detector in the region of the so-called detection optical unit in order to facilitate phase contrast imaging. This may result in structural limitations.

Techniques in which a phase contrast can be obtained by means of structured illumination are also known. By way of example, see DE 10 2014 112 242 A1 or U.S. Pat. No. 9,507,138 B2 or L. Tian and L. Waller: "Quantitative differential phase contrast imaging in an LED array microscope", Optics Express 23 (2015), 11394.

However, even those techniques mentioned above have certain limitations. By way of example, the phase contrast that is obtainable by means of fixedly defined illumination geometries may be comparatively limited.

BRIEF DESCRIPTION OF THE INVENTION

Therefore, there is a need for improved techniques for imaging a sample object by means of structured illumination. In particular, there is a need for such techniques which alleviate or eliminate at least some of the limitations and disadvantages mentioned above.

This object is achieved by the features of the independent patent claims. The features of the dependent patent claims define embodiments.

A method comprises the determination of an object transfer function (sometimes also referred to as object transmission function) for a sample object. Here, the object transfer function is determined on the basis of a reference measurement. The method also comprises performing an optimization for finding an optimized illumination geometry on the basis of the object transfer function and further on the basis of an optical transfer function for an optical unit. The method also comprises the actuation of at least one illumination module for illuminating a sample object with the optimized illumination geometry and by means of the optical unit. Optionally, the method could comprise the actuation of at least one detector for capturing an image of the sample object by means of the optical unit, with the image being associated with the optimized illumination geometry.

By carrying out the optimization for finding the optimized illumination geometry, it is possible to efficiently search a large search space, even for illumination modules with many degrees of freedom—for example, with many adjustable illumination elements. By way of example, the optimization can be carried out in a purely computer-based manner; i.e., without the necessity of also taking account of measurement data while carrying out the optimization. This allows the optimization to be carried out particularly quickly. Then, the optimized illumination geometry may bring about a particularly large phase contrast or may meet a differently defined optimization criterion in the image associated with the optimized illumination geometry for the sample object. Here, it may be possible to dispense with carrying out further post-processing steps of the image captured with the optimized illumination geometry, such as, e.g., combining the latter with further images that would be associated with a different illumination geometry. Therefore, it may be possible, in particular, to observe the sample object through an eyepiece and already image the phase contrast, for example without further digital post-processing.

A computer program product comprises control instructions, which can be executed by at least one processor. Executing the control instructions causes the processor to carry out a method. The method comprises the determination of an object transfer function for a sample object. Here, the object transfer function is determined on the basis of a reference measurement. The method also comprises performing an optimization for finding an optimized illumination geometry on the basis of the object transfer function and further on the basis of an optical transfer function for an optical unit. The method also comprises the actuation of at least one illumination module for illuminating a sample object with the optimized illumination geometry and by means of the optical unit. Optionally, the method could comprise the actuation of at least one detector for capturing an image of the sample object by means of the optical unit, with the image being associated with the optimized illumination geometry.

A computer program comprises control instructions, which can be executed by at least one processor. Executing the control instructions causes the processor to carry out a method. The method comprises the determination of an object transfer function for a sample object. Here, the object transfer function is determined on the basis of a reference measurement. The method also comprises performing an optimization for finding an optimized illumination geometry on the basis of the object transfer function and further on the basis of an optical transfer function for an optical unit. The method also comprises the actuation of at least one illumination module for illuminating a sample object with the optimized illumination geometry and by means of the optical unit. Optionally, the method could comprise the actuation of at least one detector for capturing an image of the sample object by means of the optical unit, with the image being associated with the optimized illumination geometry.

A controller comprises at least one processor. The at least one processor is configured to carry out the following steps: on the basis of a reference measurement: determining an object transfer function for a sample object; and on the basis of the object transfer function and further on the basis of an optical transfer function for an optical unit: performing an optimization for finding an optimized illumination geometry; and actuating at least one illumination module for illuminating the sample object with the optimized illumination geometry and by means of the optical unit.

A method comprises capturing a reference image of a sample object. The method also comprises classifying the sample object using an artificial neural network (ANN) on the basis of the reference image. The method furthermore comprises determining an illumination geometry on the basis of the classification and actuating at least one illumination module for illuminating the sample object with the determined illumination geometry. Furthermore, the method could comprise the actuation of at least one detector for capturing an image of the sample object, with the image of the sample object being associated with the determined illumination geometry.

ANNs render it possible to carry out a suitably trained classification of the sample object on the basis of the reference image in a particularly efficient and fast manner. It was observed that the suitable illumination geometry can be determined particularly quickly by means of such a classification. This may promote real-time applications, in particular. As a result of the scalability of the complexity mapped by ANNs when classifying features and structures of the sample object, it is also possible to cover a particularly large search space—for example, for different types of sample objects—by means of such techniques.

A computer program product comprises control instructions, which can be executed by at least one processor. Executing the control instructions causes the processor to carry out a method. The method comprises capturing a reference image of a sample object. The method also comprises classifying the sample object using an ANN on the basis of the reference image. The method furthermore comprises determining an illumination geometry on the basis of the classification and actuating at least one illumination module for illuminating the sample object with the determined illumination geometry. Furthermore, the method could comprise the actuation of at least one detector for capturing an image of the sample object, with the image of the sample object being associated with the determined illumination geometry.

A computer program comprises control instructions, which can be executed by at least one processor. Executing the control instructions causes the processor to carry out a method. The method comprises capturing a reference image of a sample object. The method also comprises classifying the sample object using an ANN on the basis of the reference image. The method furthermore comprises determining an illumination geometry on the basis of the classification and actuating at least one illumination module for illuminating the sample object with the determined illumination geometry. Furthermore, the method could comprise the actuation of at least one detector for capturing an image of the sample object, with the image of the sample object being associated with the determined illumination geometry.

A controller comprises at least one processor. The at least one processor is configured to execute the following steps: capturing a reference image of a sample object; and classifying the sample object using an artificial neural network on the basis of the reference image; and determining an illumination geometry on the basis of the classification; and actuating at least one illumination module for illuminating the sample object with the determined illumination geometry.

A method comprises classifying the sample object. Then, a database can be accessed on the basis of the classification in order to ascertain an illumination geometry. The method furthermore comprises the actuation of at least one illumination module for illuminating a sample object with the determined illumination geometry.

By way of example, it would be possible for the classification of the sample object to be implemented manually. By way of example, a sample object type, e.g., a biological sample, drinking water, bacteria, etc., could be classified manually. Then it would be possible for corresponding predetermined entries in the database to provide a link between correspondingly classified sample objects and suitable illumination geometries. In particular, such a technique can facilitate a particularly accurate and fast determination of the suitable illumination geometry for certain routine problems, which often require imaging of the same types of sample objects.

A computer program product comprises control instructions, which can be executed by at least one processor. Executing the control instructions causes the processor to carry out a method. The method comprises classifying the sample object. Then, a database can be accessed on the basis of the classification in order to ascertain an illumination geometry. Furthermore, the method comprises actuating at least one illumination module for illuminating a sample object with the determined illumination geometry and, optionally, actuating at least one detector for capturing an image of the sample object, which is associated with the illumination geometry.

A computer program comprises control instructions, which can be executed by at least one processor. Executing the control instructions causes the processor to carry out a method. The method comprises classifying the sample object. Then, a database can be accessed on the basis of the classification in order to ascertain an illumination geometry. Furthermore, the method comprises actuating at least one illumination module for illuminating a sample object with the determined illumination geometry and, optionally, actuating at least one detector for capturing an image of the sample object, which is associated with the illumination geometry.

A controller comprises at least one processor. The at least one processor is configured to execute the following steps: classifying a sample object; and on the basis of the classification: accessing a database for ascertaining an illumination geometry; and actuating at least one illumination module for illuminating the sample object with the determined illumination geometry; and, optionally, actuating at least one detector for capturing an image of the sample object that is associated with the illumination geometry.

The features set out above and features that are described below may be used not only in the corresponding combinations explicitly set out, but also in further combinations or in isolation, without departing from the scope of protection of the present invention.

BRIEF DESCRIPTION OF THE FIGURES

FIG. 6 is a flowchart of one exemplary method.

DETAILED DESCRIPTION OF EMBODIMENTS

Figure 1:
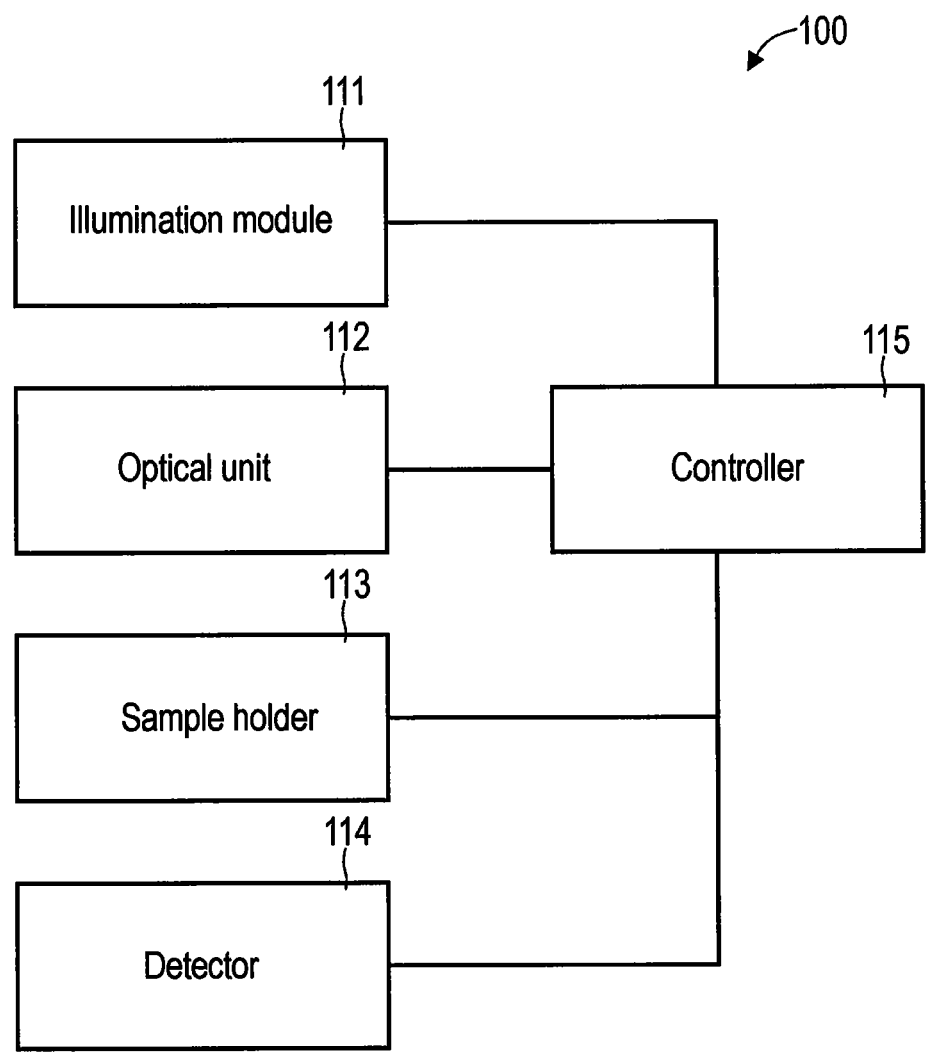
FIG. 1 schematically illustrates an optical system comprising an illumination module that is configured for structured illumination of a sample object fixated by a sample holder according to various examples.

The properties, features and advantages of this invention described above and the way in which they are achieved will become clearer and more clearly comprehensible in association with the following description of the exemplary embodiments which are explained in greater detail in association with the drawings.

The present invention is explained in greater detail below on the basis of preferred embodiments with reference to the drawings. In the figures, identical reference signs designate identical or similar elements. The figures are schematic representations of different embodiments of the invention. Elements illustrated in the figures are not necessarily depicted as true to scale. Rather, the different elements illustrated in the figures are reproduced in such a way that their function and general purpose become comprehensible to the person skilled in the art. Connections and couplings between functional units and elements as illustrated in the figures may also be implemented as an indirect connection or coupling. A connection or coupling may be implemented in a wired or wireless manner. Functional units may be implemented as hardware, software or a combination of hardware and software.

Techniques for phase contrast imaging are described below. The influence of the illumination geometry on the image creation and contrast methods in the light microscope was already formulated by Ernst Abbe in 1866. On the basis of the laws of partly coherent imaging, techniques described herein are described for imaging phase objects, that are invisible to a bright field microscope, such as cells and fibers, with a high contrast using digital contrast methods.

Widely used methods such as the Zernike phase contrast method or differential interference contrast (DIC) allow the object phase to be imaged using specific optical units. The techniques described herein render it possible to make do without modified lenses and render visible phase objects directly and in real time when gazing through the eyepiece. To this end, a particularly suitable illumination geometry is used for illuminating the sample object.

Various examples described herein are based on the discovery that a priori information about the sample object is often not available in typical applications, such as microscopy, for example. This is the case because the imaging of unknown sample objects is often sought after. This means that in contrast to lithography techniques, for example, no a priori information is available about the sample object (the well-known mask in the case of lithography). The various examples described herein nevertheless render it possible to find a suitable illumination geometry for the sample object.

In some examples, an object transfer function for the sample object is determined here on the basis of a reference measurement. By way of example, the object transfer function can describe the influence of the sample object on light incident from an illumination module. The influence of the optical unit for imaging is described by an optical transfer function.

Here, there are known different techniques for determining the object transfer function and/or optical transfer function. Any sample object, represented by a two-dimensional object transfer function t(x, y), can be divided into its different spatial frequencies using Fourier decomposition. Consequently, each sample object can be modeled as a superposition of infinitely many harmonic grids. Here, the object transfer function t(x,y) may assume complex values and generally follows the form:

$$t(x,y)=A_0(x,y)\cdot e^{i\phi(x,y)}=A_0\cdot \cos(\phi(x,y))+A_0\cdot i\,\sin(\phi(x,y)),$$

where $A_0$ corresponds to the amplitude and $\phi$ corresponds to the complex phase of the object. Here, $A_0$ specifies the damping of the amplitude of the incident light field. By contrast, the phase quantifies the relative phase delay of the passing wavefield. In one example, the object transfer function and the optical transfer function, together, could be implemented on the basis of a model according to Abbe. Such a technique, which is often also referred to as "sum of the light sources", abstracts a given light source as a sum of infinitely many point light sources. Each point of the light source—coherent per se, but incoherent in relation to one another—produces a plane wave at an appropriate angle after an inverse Fourier transform. The phase offset of the wave produced by an off-axis illumination shifts the object spectrum, as is evident from multiplying the incident wave by the complex object transfer function. In the frequency domain, the field distribution of the light in the image can be represented as a product of the Fourier transform of the optical transfer function and the so-called object spectrum. The object spectrum, too, corresponds to the object transfer function. An individual source point coherently illuminates the sample object with a plane wave and produces a field strength in the image. By a summation of all source points over the area of the effective light source and a subsequent limit value consideration, the intensity emerges from the square of the absolute value of the superposition of the shifted object spectra convolved with a point spread function of the optical transfer function.

A further example relates to determining the object transfer function on the basis of a technique according to Hopkins; see H. H. Hopkins "On the Diffraction Theory of Optical Images", Proceedings of the Royal Society A: Mathematical, Physical Engineering Sciences 217 (1953) 408-432. Proceeding from Abbe's method for determining the object transfer function, in which an extended light source is considered equivalent to a sum of many mutually incoherent point light sources, the calculation of a partly coherent imaging system according to Hopkins corresponds to a simplified and approximate variant. Here, initial integration over the source area is only followed by summing the orders of diffraction. This is advantageous in that the optical system is separated out of the calculation. The bilinear nature of the mapping in the partly coherent case is expressed by the superposition of an object point pair or the spectrum of the object transfer function. From this, it is possible to determine the transmission cross coefficient matrix (TCC), which is sometimes also referred to as a partly coherent object transfer function.

The TCC approximately corresponds to the transfer function of the party coherent imaging and contains the properties of the optical system and of the illumination geometry. The frequencies transferred by the optical unit are restricted to the range in which the TCC adopts values not equal to 0. A system with a high coherence factor or coherence parameter consequently has a relatively large area with TCC≠0 and it is able to map higher spatial frequencies. The TCC typically includes the whole information of the optical system and the TCC often also takes account of complex-valued pupils, like in the Zernike phase contrast, for example, or as triggered by aberrations. The TCC may facilitate a separation of the optical transfer function from the object transfer function. Typically, the TCC is defined as a 4D matrix, wherein each value of the 4D matrix should be associated with a spatial frequency pair of the object spectrum of the separate object transfer function. This value corresponds to the damping of each frequency pair. A simulated image arises by summing the intensities arising therefrom and subsequently carrying out an inverse Fourier transform.

The TCC renders it possible to store an existing optical system on the computer in the form of a 4D matrix and merely carry out a multiplication from the object spectrum or the simulated object transfer function and the TCC when changing the sample object, instead of individually propagating each source point by means of an FFT as in the case of Abbe's method. This allows the optimization to be carried out in a particularly computationally efficient manner.

Expressed differently, a simulated image can therefore be determined from filtering the object spectrum of the object transfer function with the four-dimensional filter function of the TCC, wherein the TCC can initially be calculated independently of the sample object. As a result, frequencies that may not even be subsequently triggered by a sample object are often also taken into account. It is for this reason that it may sometimes be desirable to further process the TCC by virtue of the optical system being decomposed into a finite number of individual coherent partial systems. This is often also referred to as sum over coherent system. In so doing, the four-dimensional TCC can be decomposed into its eigenvalues and its eigenfunctions by way of a singular value decomposition. Each eigenfunction in turn corresponds to a source point of the light source and produces a dedicated coherent transfer function (kernel), the weighting of which in the ultimate creation of the image arising from the multiplication by the associated eigenvalue. Typically, the eigenvalues decay rapidly on account of the energy-compensating property of the singular value decomposition. This leads to an accurate determination of a simulated image already being able to be implemented from the superposition of a few coherent systems. By way of example, in the case of a coherence factor of S≤0.5, the first kernel is already sufficient and leads to an error of <10% during the creation of the image. The eigenvalues and eigenfunctions remain constant for a given optical arrangement, even if the object is varied, and are therefore likewise calculable in advance. As a result, it is possible, for example, to determine a two-dimensional transmission cross coefficient matrix as an approximation or simplification of the four-dimensional transmission cross coefficient matrix. Only some of the eigenfunctions, in which the four-dimensional transmission cross coefficient matrix experiences a linear decomposition, are used for the actual simulation of the optical system.

Thus, on the basis of such techniques, it is possible to determine the object transfer function and the optical transfer function and, for example, subsequently to produce one or more simulated images on the basis of a suitable illumination geometry. Then, an optimization for finding an optimized illumination geometry can be carried out in some examples on the basis of the object transfer function and, further, on the basis of the optical transfer function. Here, a plurality of simulated images of the sample object can be checked iteratively in respect of an optimization criterion, for example on the basis of the optical transfer function and the object transfer function. Here, the simulated images may be associated with different simulated test illumination geometries.

However, there is no need to carry out an optimization for finding the optimized illumination geometry in other examples. By way of example, classifying the sample object with an ANN on the basis of a previously captured reference image would be possible according to various implementations. Then, the illumination geometry could be determined on the basis of the classification. An ANN typically learns the relationship between the sample object and a suitable illumination geometry. To this end, use can be made of a data record, frequently also as a training data record, which makes available a predefined list of reference sample objects and associated preferred reference illumination geometries.

An exemplary implementation of neural networks comprises a convolutional neural network (CNN). See, e.g., Krizhevsky, Alex, Ilya Sutskever, and Geoffrey E. Hinton. "Imagenet classification with deep convolutional neural networks." Advances in neural information processing systems. 2012 or Lawrence, Steve, et al. "Face recognition: A convolutional neural-network approach." IEEE transactions on neural networks 8.1 (1997): 98-113 or Simard, Patrice Y., David Steinkraus, and John C. Platt. "Best Practices for Convolutional Neural Networks Applied to Visual Document Analysis." ICDAR. Vol. 3. 2003. Here, convolutions are determined in so-called convolutional layers between three-dimensional kernels and three-dimensional sensitive regions (receptive field) of an input matrix (input feature map). Here, different kernels can be repeatedly applied to different receptive fields of the input feature map, as a result of which translational invariance is provided in respect of the patterns or features of the sample object to be identified.

There can also be a manual classification of the sample object in further examples, wherein classification can subsequently be implemented on a database for ascertaining the illumination geometries as a function thereof. Such techniques may be desirable, particularly in daily use with recurring types of sample objects.

FIG. 1 illustrates an exemplary optical system 100. By way of example, the optical system 100 according to the example of FIG. 1 could implement a light microscope, for example with transmitted light geometry. The optical system 100 may allow the magnified representation of small structures of a sample object fixated to a sample holder 113. By way of example, the optical system 100 could implement a wide-field microscope, in which a sample is illuminated over its entire area. By way of example, in this way, a cell colony to be examined as a sample object can be characterized as pathological by a gaze through an eyepiece of the optical unit 112 of the optical system 100 without initially evaluating or reconstructing the recorded data by a computer. In other examples, the optical system 100 could also implement a laser scanning microscope, in which the sample object is scanned point-by-point and assembled to form a two-dimensional image in a subsequent process.

The optical system 100 also comprises an illumination module 111. The illumination module 111 is configured to illuminate the sample object fixated on the sample holder 113. By way of example, this illumination could be implemented by means of Köhler illumination. Here, use is made of a condenser lens and a condenser aperture stop. This leads to a particularly homogeneous intensity distribution in the plane of the sample object of the light used for illumination purposes.

In the example of FIG. 1, the illumination module 111 is configured to facilitate a structured illumination. This means that different illumination geometries of the light employed to illuminate the sample object can be implemented by means of the illumination module 111. Here, different techniques for providing the different illumination geometries are possible in the various examples described herein. By way of example, the illumination module 111 could comprise a plurality of adjustable illumination elements that are configured to locally modify or emit light. A controller 115 can actuate the illumination module 111 or the adjustable elements for the purposes of implementing a certain illumination geometry. By way of example, the controller 115 could be implemented as a microprocessor or microcontroller. As an alternative or in addition thereto, the controller 115 could comprise an FPGA or ASIC, for example.

Figure 2:
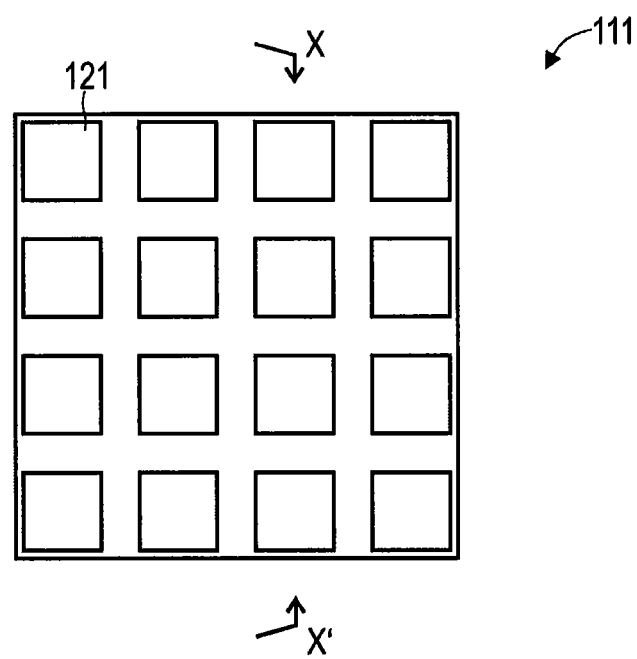
FIG. 2 schematically illustrates the illumination module in greater detail, wherein the illumination module comprises a matrix of adjustable illumination elements according to various examples.

FIG. 2 illustrates aspects in relation to the illumination module 111. FIG. 2 illustrates that the illumination module 111 comprises a multiplicity of adjustable illumination elements 121 in a matrix structure. Instead of a matrix structure it would also be possible, in other examples, to use different geometric arrangements of the adjustable elements, for example a ring-shaped arrangement, a semicircular arrangement, etc.

In one example, the adjustable illumination elements 121 could be implemented as light sources, for example as light-emitting diodes. Then, it would be possible, for example, for different light-emitting diodes with different luminous intensities to emit light for illuminating the sample object. An illumination geometry can be implemented in this way. In a further implementation, the illumination module 111 could be implemented as a spatial light modulator (SLM). The SLM can undertake a spatially resolved intervention in a condenser pupil, which may have a direct effect on the imaging—for example, formally mapped by means of the TCC. In so doing, the SLM may comprise a plurality of adjustable elements 121, for example micromirrors or liquid crystals. By way of example, the SLM can implement a digital micromirror device (DMD). Here, a mirror that is tiltable by micromechanical means is positionable in two positions depending on the electrostatic field, appliable from an external source, between the mirror and the carrier material. Each adjustable element 121, as a pixel, may have dimensions of approximately 11.8-16 µm and switching frequencies of approximately 5 kHz. These micromirrors deflect the incident beam either onto an absorber or in the direction of the subsequent application. Liquid crystals, in turn, may influence the phase and/or the amplitude of the incident wavefront. The adjustable illumination elements 121 may be implemented as liquid crystal cells, which are arranged between two transparent electrodes. The alignment of these crystals is modified when an external voltage or an external electric field is applied. The birefringent property of the liquid crystal brings about a spatial variation in the refractive index or a change in the polarization of the electromagnetic wave.

Such SLMs or other SLMs may be arranged in the condenser aperture plane of the illumination module 111. By way of example, it is possible to replace the condenser aperture stop by a pixelated SLM. By varying the transmission of individual pixels, symmetric or continuous illumination geometries, such as a ring-shaped stop or oblique illumination, are possible in addition to arbitrary illumination geometries. Furthermore, an SLM, even in the form of a DMD, can be used in a plane conjugate to the condenser aperture. Active LED matrices could likewise be used to this end. In order to ensure the correct functionality, it is often desirable for linearity to exist between the light source, the SLM and the camera. The actuation behavior of an LCD can be calibrated with a gamma correction. The SLM can be used in a transmission mode, wherein an LED or halogen lamp, for example, represents the actual light source.

Figure 3:
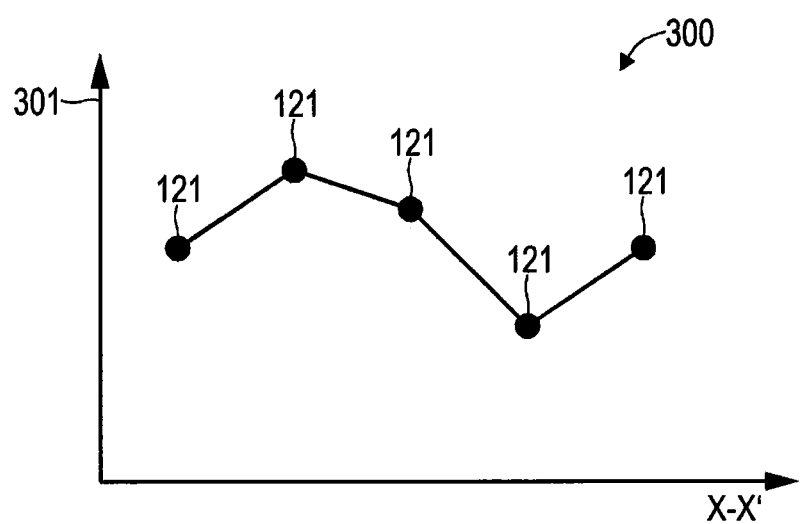
FIG. 3 schematically illustrates an exemplary illumination geometry for the illumination module according to FIG. 2.

FIG. 3 illustrates aspects in relation to an exemplary illumination geometry 300. FIG. 3 illustrates the provided luminous intensity 301 for the various adjustable elements 121 of the illumination module 111 along the axis X-X' of FIG. 2. While FIG. 3 illustrates a continuously varying luminous intensity, the illumination module could also provide illumination elements 121 with an on/off functionality in other examples It Is evident from FIG. 3 that the different adjustable illumination elements 121 of the illumination module 111 provide different luminous intensities 301 in the illustrated illumination geometry 300. Certain details of the sample objects or certain object frequencies/information items can be amplified or attenuated in the various examples described herein by the targeted masking of intensities in the effective light source or by other implementations of the illumination geometries. A suitable illumination geometry can be found in the various examples described herein, said illumination geometry leading to frequencies that would otherwise destroy, e.g., the phase contrast in an image of the sample object as a result of destructive interference being avoided or suppressed. In this way, a particularly good image result can be obtained for the image of the sample object, for example in comparison with conventional bright field illumination. In addition to a particular emphasis on the phase contrast, other quality criteria could also be taken into account.

Optimization of the setting for each adjustable illumination element may be possible in the various examples described herein. This means that non-monotonic or arbitrary settings of the illumination elements can be used for implementing a suitable illumination geometry. This may facilitate a more flexible optimization of the image result, in particular in relation to techniques which use, e.g., fixed semicircular illumination geometries, etc. By way of example, it is evident from FIG. 3 that the illumination geometry 300 corresponds to a non-monotonic variation from illumination element 121 to illumination element 121.

Figure 4:
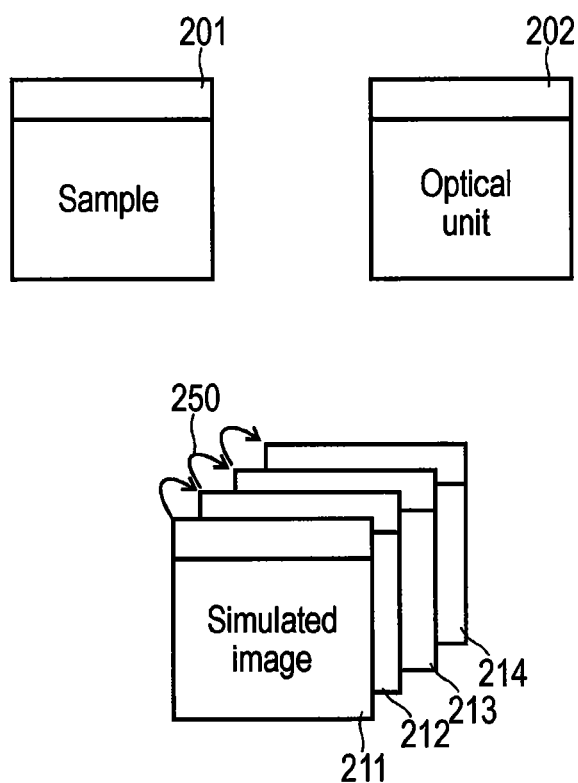
FIG. 4 schematically illustrates aspects in relation to performing an optimization for finding an optimized illumination geometry.

FIG. 4 illustrates aspects in relation to determining an optimized illumination geometry 300 by means of an optimization 250. In the example of FIG. 4, the optimized illumination geometry 300 is found automatically with the aid of appropriate computer-based algorithms. Here, a priori information about the sample object being present is not required in the various techniques described herein. Rather, an object transfer function 201 is determined on the basis of a reference measurement. Then, the optimization 250 for finding the optimized illumination geometry 300 can be carried out together with an optical transfer function 202.

To this end, it is possible, for example, for the optimization 250 to iteratively determine a plurality of simulated images 211-214 of the sample object on the basis of the object transfer function 201 and further on the basis of the optical transfer function 202. Then, a check can be carried out in respect of an optimization criterion as to whether one of the simulated images 211-214 satisfies an optimization criterion. By way of example, it would be possible for different simulated images 211-214 to be associated with different test illumination geometries.

Then, the employed optical transfer function 202 can be predetermined and, for example, stored in a non-volatile memory. By way of example, the optical transfer function 202 could comprise a four-dimensional TCC or a two-dimensional TCC corresponding to dominant eigenvectors of the four-dimensional TCC.

Here, different optical transfer functions 202 can be associated with different illumination geometries 300. This means that a set of optical transfer functions 202 can be provided, said set corresponding to the different test illumination geometries 300. In other examples, it would also be possible for the respective optical transfer function 202 to be determined on the basis of the test illumination geometry currently used for the corresponding simulated image 211-214.

It is evident from FIG. 4 that parameters used for the image recording, such as, e.g., the NA of the objective and condenser—i.e., in general, of the optical unit 112—, may be known a priori. A digital model of the optical system can be produced on the computer, wherein this model may be calculated only once and may then be reused, for example as a TCC, even in the case of changing sample objects or object transfer functions.

Figure 5:
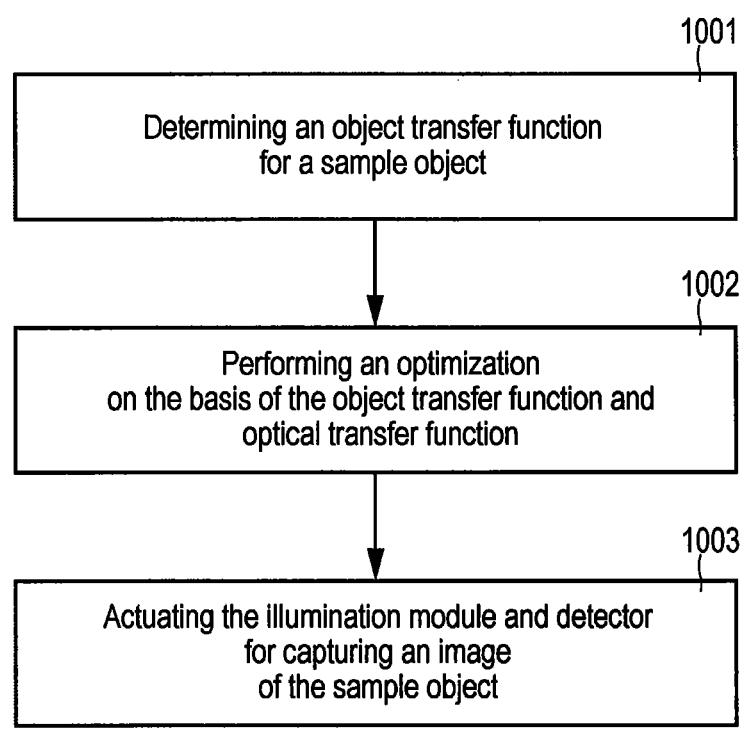
FIG. 5 is a flowchart of one exemplary method.

FIG. 5 illustrates one exemplary method. Initially, an object transfer function for a sample object is determined in 1001. This can be implemented on the basis of a reference measurement. By way of example, the four-dimensional TCC or the two-dimensional TCC may be determined.

Subsequently, an optimization is performed in 1002. This is implemented on the basis of the object transfer function determined in 1001 and an optical transfer function. The optical transfer function may be stored in predefined fashion in a memory. By way of example, different optical transfer functions for different test illumination geometries that are taken into account within the scope of the optimization may be stored in the memory.

Then, the illumination module and a detector for capturing an image of the sample object are actuated in 1003. Here, use is made of an illumination geometry found on the basis of the optimization from 1002. Capturing the image of the sample object by means of the detector is optional as a matter of principle. Alternatively, it would be possible, for example, for only illuminating the sample object with the found illumination geometry and by means of a suitable illumination module to be implemented such that an observation is carried out by a user, for example through an eyepiece, without digitization.

By way of example, the method according to FIG. 5 could be carried out by a controller 115 of the optical system 100 (see FIG. 1).

FIG. 6 is a flowchart of one exemplary method. A reference measurement is carried out in 1011 in order to determine the object transfer function. Very different techniques for determining the object transfer function can be used in the different examples described herein. Accordingly, the required reference measurement may also vary. In order to have a basis for optimizing the illumination geometry, an approximate information item about the amplitude and the phase of the sample object is often necessary. This means that the object transfer function is determined. The object amplitude can be determined by means of an intensity image.

There are various phase reconstruction algorithms, such as the transport intensity equation (TIE), which reconstructs the phase from a recording stack with different focal positions along the Z-axis by way of an iterative process. This is achieved by other methods by recording an interferogram and subsequently carrying out an evaluation. By influencing the illumination geometry, it is possible to reconstruct the phase from a plurality of recordings with different illumination angles as a basis, for example by an iterative phase reconstruction algorithm, e.g., a Gerchberg-Saxton algorithm.

It is thus possible for the reference measurement to be carried out by actuating the illumination module 111 for illuminating the sample object from different initial illumination geometries—such as well-defined illumination directions, in particular—and by actuating the detector for capturing a plurality of initial images of the sample object, which are associated with different initial illumination geometries. Then, a phase contrast-weighted reference image of the sample object can be determined on the basis of the plurality of initial images of the sample object. Here, the reference image in some examples may contain a qualitative information item about the object phase. By way of example, this may be well suited to segmenting, contrasting and observing cells. However, the phase contrast-weighted reference image with a quantitatively evaluable information item may also be determined by way of the object phase in other examples. From this, the refractive indices within the sample can be determined.

One technique of the phase contrast-weighted reference image relates to the iterative Fourier transform algorithm. In the iterative Fourier transform algorithm, the input values are an intensity measurement at a certain Z-position, for which the initially unknown phase should be found, and a further measurement at a further Z-position. The complex light field $E_{init}=A_0 \cdot e^{(i\Phi_{init})}$ forms from the amplitude or the square root of the measured intensity distribution $A_0=\sqrt{I_{z0}}$ and an initial phase $e^{(i\Phi_{init})}$, which is often chosen with random values The spectrum, in which the amplitude is extracted and replaced by the amplitude of the spectrum from the second measurement $A_1=\sqrt{I_{z1}}$, is produced by the propagation into the frequency space by means of a Fourier transform.

This field is propagated into the preceding plane by way of an inverse transformation, where there is a renewed replacement of the amplitude by the intensity measured in the plane. This process can be carried out within a loop with a suitable termination criterion, with the reconstructed phase successively converging to its true value.

A similar pattern is pursued by the Fourier ptychography algorithm, in which the Z-position remains constant and the illumination angles are subject to a variation. The basic idea of the algorithm lies in placing sub-spectra—which, triggered by the oblique illumination, are displaced in the frequency space—at their corresponding true position of a principal spectrum. Similar to the variant of iteratively reconstructing the phase, the phase converges here by cyclical replacement of the spectra with the measured values.

The procedure of an exemplary Fourier ptychography analysis is described below:

(I) Producing a principal spectrum: A high resolution spectrum of the amplitude and initial phase from an interpolated, e.g., factor x2, intensity measurement $E_1=\sqrt{I_{HR}} \cdot e^{i\Phi_{HR}}$, e.g., from a central illumination, which was produced by means of a Fourier transform serves as a basis.

(II) Extracting the sub-spectrum $\vec{k}_i$: The component corresponding to the frequency range of the i-th intensity measurement is cut out of the high-resolution spectrum. Here, the radius $r_{MO}$ corresponds to the CTF of the objective and the center of the sub aperture corresponds to $$k(v_x, v_y) = \frac{2\pi \sin(\phi, \theta)}{\lambda}.$$

(III) Replacing the sub-spectrum by a measurement: After an inverse Fourier transform of the extracted spectrum, the amplitude is replaced by the square root of the i-th intensity measurement $E_i = \sqrt{I_{i_M}}$, with the phase $\phi_{LR}$ remaining unchanged; this follows as $E_i = E_{i_M} \cdot e^{i \Phi_{LR}}$.

(IV) Placing the updated field distribution in the high-resolution spectrum: The complex field strength $E_{i_{HR}}$ is propagated back into the frequency space by means of FFT2 and, after filtering with the CTF, shifted to the corresponding position in the high-resolution spectrum (this is carried out for all 1 . . . n recordings).

(V) Convergence of the phase: Usually, steps (II)-(IV) should be carried out approximately two to three times until the phase converges.

A comparatively simple technique for determining the phase contrast-weighted reference image is based on a combination of the initial images of the sample object. By way of example, corresponding techniques are described in DE 10 2014 112 242 A1.

Another method for facilitating a quantitative evaluation of the phase lies in exploiting the relationship between phase and intensity image. This renders it possible to formulate an object transfer function. Deconvolving the raw data—with appropriate regularization—renders it possible to quantitatively measure the phase. As a result of the incoherence of the source, the limit frequency continues to lie at twice that of a comparable coherent structure. See L. Tian and L. Waller: "Quantitative differential phase contrast imaging in an LED array microscope", Optics Express 23 (2015), 11394.

It is evident from the aforementioned examples that different techniques for determining the object transfer function can be chosen in the various implementations. Once the object transfer function has been determined, it is possible to continue to carry out the optimization. Here, a start point of the optimization and/or boundary condition of the optimization, for example, can be placed on the basis of the reference image or the object transfer function.

Figure 7:
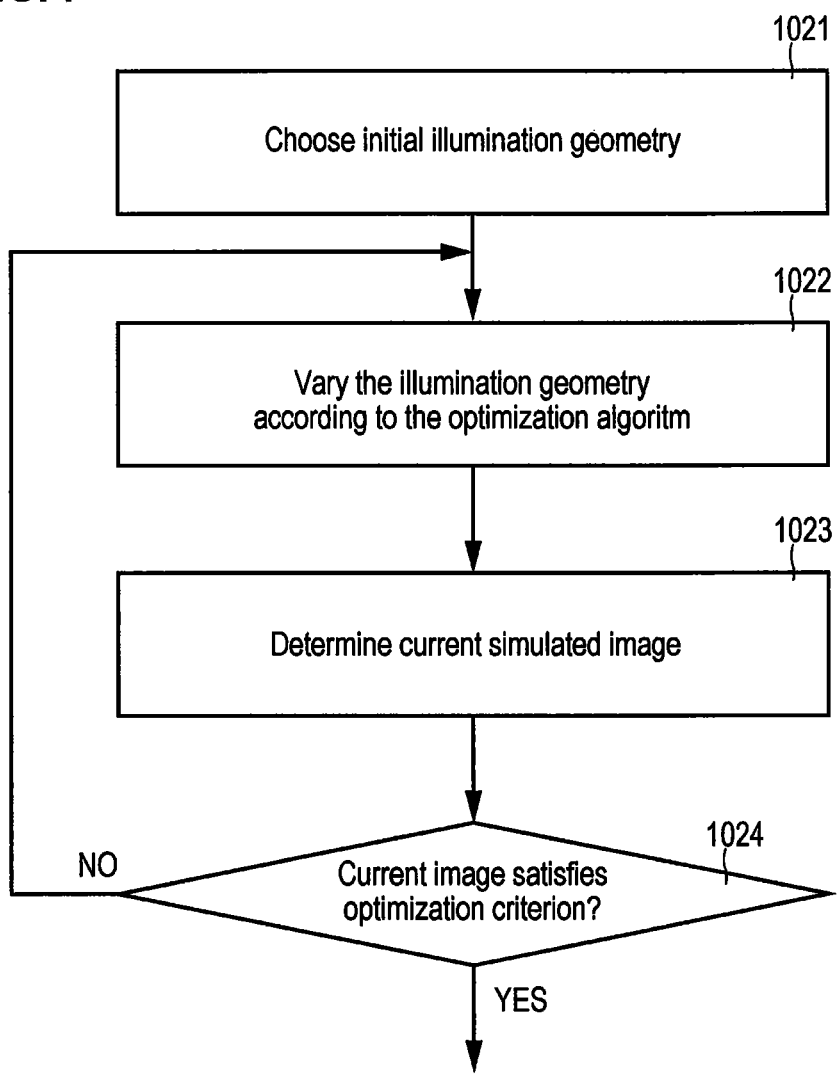
FIG. 7 is a flowchart of one exemplary method.

FIG. 7 is a flowchart of one exemplary method.

Here, an initial illumination geometry is chosen in 1021. This may correspond to placing a start point for the subsequently carried out optimization. By way of example, the initial illumination geometry could be chosen proceeding from known relationships between the previously determined object transfer function and generally suitable initial illumination geometries. By way of example, an ANN for classifying the object transfer function and choosing the initial illumination geometry on the basis of this classification could be applied in 1021.

Then, the current illumination geometry—which corresponds to the initial illumination geometry from 1021 in the first iteration—is varied in 1022 according to the chosen optimization algorithm.

Different optimization algorithms can be used in the various examples described herein. By way of example, a particle swarm algorithm could be applied. The particle swarm algorithm requires no differentiation of a target function describing the optimization criterion.

In the particle swarm algorithm, the modulation of the movement of an individual particle (which corresponds to the variant of a swarm segment adjustable within the illumination module) is implemented from up to three velocity components:

(I) the inherent velocity component (magnitude and direction) from preceding movement (or initial velocity);

(II) the velocity component of the swarm, i.e., the mean of all particles; and/or (III) the random component, corresponding to the decision of the living being.

Here, each particle x in the n-dimensional solution space—represented by the source coefficients $x_k$ (1) . . . $x_k$ (n)—corresponds to a possible solution of the inverse problem, where k corresponds to the current iteration step.

A random distribution or a distribution of the coefficients $x_1$ (1) . . . $x_1$ (n) in space arising from the initial determination of the object transfer function represents a good initial value for the so-called population. All particles of the swarm experience repositioning during each iteration k, said repositioning emerging from the velocity vector and the preceding position.

The individual particles move depending on all other particles, i.e., always in the direction of an optimum, although the latter need not be a global minimum or maximum. As a result of the increment varying in each iteration step, unlike in the case of a grid search method, the algorithm is also able to find an optimum between two nodes; this may be advantageous.

The so-called grid search algorithm is a further exemplary optimization algorithm. The grid search algorithm, of the class of direct search algorithms, distributes the initial parameters in the first step, either on the basis of a set pattern, e.g., an equidistant grid, randomly or according to an inherent initial pattern in the solution space. A grid with a certain extent in the solution space is spanned with each iteration step around a node k formed by the parameters $x_1$ (1) . . . $x_1$ (i). Each corner or node $k_i$ represents a new possible solution, represented by the parameters $x_i$ (1) . . . $x_i$ (i), of the target function describing the optimization criterion. If the target function improves at one of these nodes, the latter forms the center for the next iteration step. The extent of the grid reduces as soon as the algorithm comes closer to a minimum. If no minimum is found within the iteration step, the extent of the meshes within the solution space is increased in order to expand the search region.

The search space to be covered by the optimization, which should be covered by a suitable variation of the illumination geometries in 1022, can be comparatively large in various examples. This is because the illumination module typically has a number of parameters to be optimized, which influence the illumination geometry. In an example, a light modulator, for example, comprises N×M pixels in the condenser pupil as illumination elements, which are switchable in digital fashion or in grayscales. A particularly large search space arises as a result of the (N×M)^x different possible combinations—where x corresponds to the number of switchable levels. Often, e.g., N and/or M can be >100, optionally >1000, further optionally >5000.

Therefore, it may be desirable in some examples to simplify the variation of the illumination geometry in 1022. To this end, the test illumination geometry can be determined on the basis of a weighted superposition of different components of a polynomial series expansion, such as, e.g., Zernike polynomials, in some examples.

Expressed differently, it is therefore possible to simplify the pixel structure of a light modulator or, in general, the available illumination geometries by parameterization. By way of example, Zernike polynomials can be used to this end in order to decompose the circular pupil. Here, the Zernike polynomials form a radial basis. A circle could also be subdivided into a number of circular segments. Each Zernike polynomial, associated with a Zernike coefficient, or each circular segment can then be simulated independently of one another in advance as a test illumination geometry by means of the optical transfer function, and can be stored. Expressed differently, a multiplicity of optical transfer functions can thus be predetermined for the various components of the polynomial series expansion. Then, a weighted superposition of the optical transfer functions produced in advance can be used as a superposition for determining the simulated images. This can significantly reduce the computational outlay. As a result, a faster performance of the optimization can be facilitated.

In 1023, a simulated image can be determined by means of such techniques. The simulated image can be determined from a combination of the optical transfer function and the object transfer function.

Then, a check is carried out in 1024 as to whether the current simulated image satisfies the predetermined optimization criterion. The corresponding quality function, which quantifies the current status of the optimization, can be freely chosen. By way of example, if the phase contrast is in the foreground, partly coherent imaging of a complex-valued object transfer function can be simulated. The contrast in the simulated image, in particular the intensity thereof, changes when the coefficients are varied. The coefficients are modified by a suitable optimizer in such a way that they minimize a given cost function or improve a given optimization criterion.

By way of example, the optimization criterion can better assess the presence of higher spatial frequencies in the image, which may lead to a higher resolution of object details, for example. Thus, it would accordingly be possible for the optimization criterion to comprise an image contrast of the simulated images. In particular, the image contrast can correspond to the higher spatial frequencies. As an alternative or in addition thereto, it would also be possible for the optimization criterion to comprise an object similarity of an image of the sample object in the simulated images with a reference, sample object (fidelity).

Thus, the reference sample object serves as a reference in the process, on the basis of which the optimal phase contrast is intended to be produced. The phase measurement, e.g., phi=0 . . . pi, can be mapped into an intensity color space with grayscale values of 0 . . . 255, for example. Then, the optimization manipulates the light source until the difference between the measured intensity on the detector, which corresponds to the result of the object transfer functions convolved or filtered with the TCC, and the object phase mapped from the "phase space" (0 . . . pi) to the intensity is as small as possible. The same also applies to the amplitude, for example by virtue of the amplitude measurement being manipulated in advance in such a way that low frequencies are cut out and the optimized image is compared to this reference.

From the field of interferometry, the so-called Michelson contrast is given as:

$$c = \frac{I_{max} - I_{min}}{I_{max} - I_{min}},$$

with the maximum $I_{max}$ and minimum $I_{min}$ intensities. An application to the simulated image is sometimes difficult since both the minimum and maximum pixel grayscale value may arise from noise, for example. Therefore, use can be made of the CPP contrast, which is calculated as follows:

$$F = \sqrt{\frac{1}{MN}\sum_{i=0}^{N-1}\sum_{j=0}^{M-1}(I_{ij} - \bar{I})^2}.$$

The so-called "fidelity" or object similarity can be used as a further optimization criterion. This often refers to the square of the absolute value of the difference between the ideal and real image:

$$F = \|I - I_{ideal}\|^2$$

$$I_{ideal}(x) = |t(x)|^2 \text{ or } I_{ideal}(x) = \arg(t(x)) \text{ in phase objects}$$

$$F = \sqrt{\sum_x I(x) - |t(x)|^2}$$

with the reconstructed transfer function t(x) and the aerial image I(x).

If the current image is determined as not yet satisfying the optimization criterion in 1024, a further variation of the illumination geometry is carried out in a new iteration of 1022-1024. Otherwise, a test illumination geometry has been found, which, as illumination geometry, is suitable for the subsequent actual illumination of the sample for capturing an image.

Figure 8:
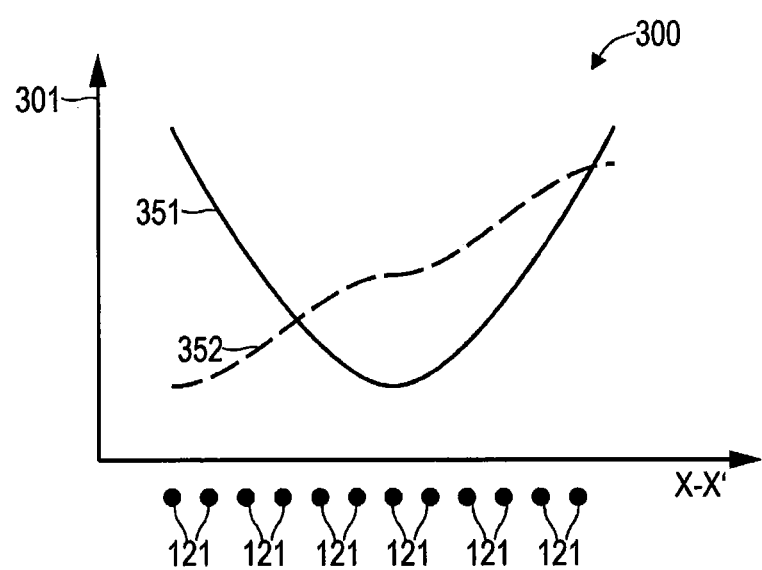
FIG. 8 schematically illustrates an exemplary illumination geometry which is determined on the basis of a weighted superposition of various components of a polynomial series expansion according to various examples.

FIG. 8 illustrates aspects in respect of the variation of the test illumination geometry within the scope of performing the optimization. FIG. 8 illustrates how the adjustable luminous intensity 301 of different adjustable elements 121 of the illumination module 111 can be determined by using parameterized polynomial series expansions. While FIG. 8 illustrates a continuously varying luminous intensity 301, the illumination module could also provide illumination elements 121 with an on/off functionality in other examples.

FIG. 8 illustrates two components 351, 353 in the exemplary polynomial series expansion. The degree of freedom of finding the best illumination geometry means a large family of possible parameters and different combinations. By way of example, approximately 25 000 adjustable illumination elements 121 may be present. Therefore, it is often expedient to restrict the optimization to a form that is defined by a few parameters. The parameterization by subdividing the condenser aperture into Zernike polynomials 351, 352 is shown. Alternatively, it would also be possible to use circular segments. As a result, there is a drastic reduction in the number of degrees of freedom, e.g., to 36 coefficients. The Zernike polynomials arise from an orthogonal expansion in the polar coordinates with a radius of 1 and are consequently circular orthogonal polynomials.

According to so-called Noll numbering, the TCCs of the first 37 coefficients, for example, are calculated in advance and superposed while performing the optimization. The Zernike polynomials may also assume negative values, which is not the case for the light source. Therefore, it is expedient to displace the zero of the intensity to, e.g., $I_0$=0.5 and to restrict the value range in the optimization to I=0 . . . 1.

In order to supply a basis for a possible solution of the optimization problem, a first illumination geometry, for example, is generated on the basis of the determined object transfer function. From the overlap regions of the principal diffraction images within the pupil, a Gaussian filter smooths the sharp edges of the resultant intensity pattern, within which a Zernike fit algorithm then searches for the corresponding Zernike coefficients which represent the surface to the best possible extent. The coefficients obtained represent the initial parameters for the subsequent optimization algorithm. After the performance of the optimization is finished, the optimized illumination geometry can then be found by virtue of, on the basis of an assignment between the functions, defined continuously in real space, of the polynomial series expansion as an optimization variable of the optimization and the plurality of discrete adjustable elements 111 of the at least one illumination module.

In conclusion, techniques that can determine an optimized illumination geometry by performing an optimization were described above. Here, a property that an image to be subsequently captured with the found illumination geometry should have can be predetermined by a suitable choice of the optimization criterion. While various examples were explained above with reference to an optimization criterion defined with respect to the phase contrast—for example, the image contrast or the object similarity—, different optimization criteria could however also be chosen in other examples. Then, it is possible to capture an image of the sample object with the found, optimized illumination geometry, said image having the desired peculiarities. By way of example, a complex-valued object transfer function containing both amplitude and phase is determined for the purposes of optimizing the phase contrast.

Various algorithms are able to reconstruct the phase, or at least approximate the latter in a sufficient form, without modifying the optical setup consisting of wide-field microscope with a digital condenser pupil. The Fourier ptychography algorithm illuminates the object from a plurality of directions and incorporates the different frequency information items in a type of iterative Fourier algorithm (iFTA). This results in the reconstructed phase in addition to an increased spatial bandwidth product.

The inverse transfer function of the quantitative phase-contrast method represents a robust option for determining the phase of thin phase objects that follow the first Born approximation. Here, two complementary semicircular patterns are represented on the SLM in each case and the intensity images are combined with one another by calculation.

Random "trial" of the parameters defining the illumination geometry—e.g., Zernike coefficients—yields a good result in only very few cases. Optimization algorithms that require the gradient of the cost function for defining an optimization criterion often cannot be used since the gradient is difficult to calculate analytically as a result of using the TCC in conjunction with SVD. For this reason, various so-called genetic algorithms can find use. The so-called particle swarm algorithm moves a swarm of particles, with each particle representing a solution with n coefficients through an n-dimensional solution space. Like in biology, the entire swarm follows a global maximum.

Figure 9:
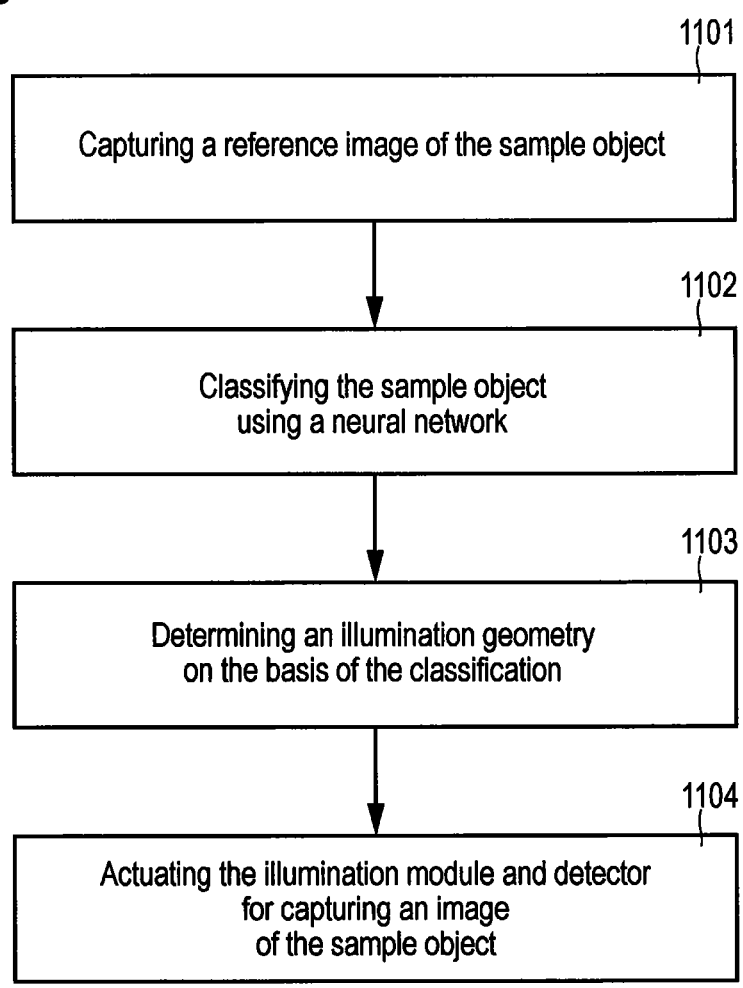
FIG. 9 is a flowchart of one exemplary method.

FIG. 9 is a flowchart of one exemplary method. FIG. 9 illustrates aspects in relation to determining an illumination geometry on the basis of an ANN.

Such techniques for determining the illumination geometry by means of an ANN are based on the discovery that it may sometimes be desirable to avoid a complicated determination of simulated images by means of an optical transfer function such as the TCC, for example.

In the example illustrated in FIG. 9, an algorithm, represented by the ANN, learns the relationship between a sample object imaged in a previously captured reference image—1101—and a preferred illumination geometry. The artificial neural network can then classify the sample object on the basis of the reference image—1102—and it is subsequently possible to determine an illumination geometry on the basis of this classification, 1103. Subsequently, an illumination module and a detector for capturing an image of the sample object can be actuated using the previously determined illumination geometry, 1104. Capturing the image of the sample object by means of the detector is optional as a matter of principle. Alternatively, it would be possible, for example, for only illuminating the sample object with the found illumination geometry and by means of a suitable illumination module to be implemented such that an observation is carried out by a user, for example through an eyepiece, without digitization.

By way of example, the method according to FIG. 9 can be carried out by the controller 115 of the optical system 100. For example, it would be possible for the ANN to comprise a CNN. Such CNNs are particularly well suited to classifying the sample object on the basis of the two-dimensional reference images.

The model, which represents the correlation between input and output of the ANN, can be trained on the basis of machine learning. By way of example, the ANN can be trained on the basis of reference illumination geometries for reference sample objects.

Here, the accuracy for a given problem tends to increase with the size of the available training set. By way of example, if the optical system is only used in metallurgy laboratories, it may be desirable for the ANN to be trained by means of reference images showing metal cuts. In the field of biology laboratories, it may be desirable to train the ANN on the basis of thin sections of cells. The ANN can be taught with dedicated optimized illumination geometries. By way of example, the reference illumination geometries during training can be determined on the basis of techniques as explained above in relation to FIGS. 4 and 5, for example.

In some examples, the ANN can be configured to provide a result in a continuously defined results space. Then, it could be possible for the illumination geometry to comprise an assignment to illumination geometries that are continuously defined in the results space of the ANN. Here, a certain discretization into the available illumination geometries may be provided, wherein a trade-off can be made between accuracy and strictness of the assignment.

Figure 10:
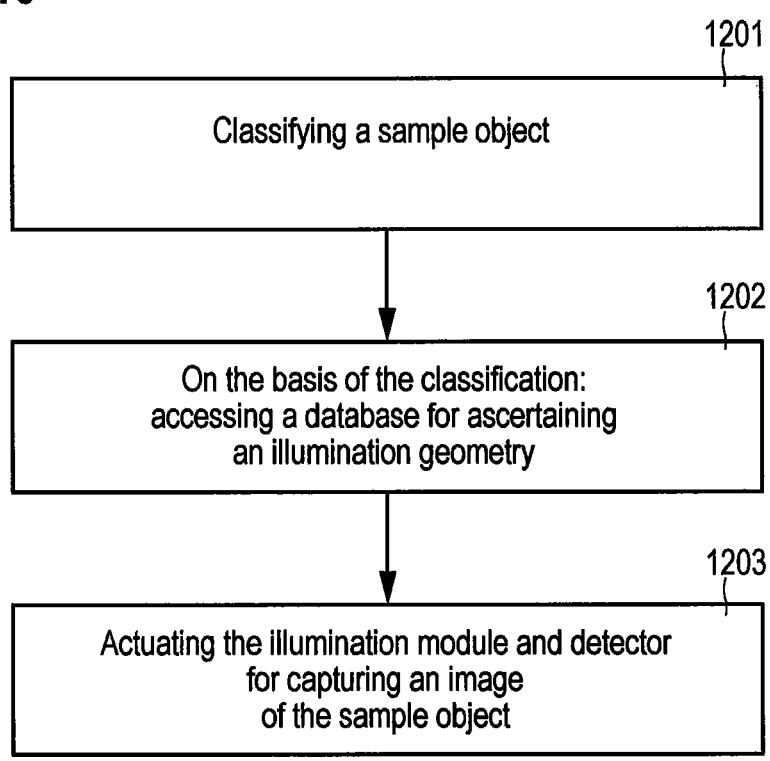
FIG. 10 is a flowchart of one exemplary method.

FIG. 10 is a flowchart of one exemplary method. Initially, the sample object is classified in 1201. By way of example, this can be implemented manually. By way of example, a type of a sample object can be set by a user. This may easily be possible, particularly in the case of recurring characterization problems by means of the optical system 100.

Then, a database is accessed in 1202 on the basis of the classification in order to ascertain an illumination geometry. Thus, the database may comprise assignments between classes of sample objects according to the classification in 1201 and illumination geometries identified as particularly suitable. By way of example, entries in the database could be created on the basis of the techniques that were described above in relation to FIGS. 4 and 5.

Subsequently, at least one illumination module for illuminating the sample object with the determined illumination geometry and a detector for capturing the image of the sample object associated with the illumination geometry are actuated, 1203. Capturing the image of the sample object by means of the detector is optional as a matter of principle. Alternatively, it would, for example, be possible for only illuminating the sample object with the found illumination geometry and by means of a suitable illumination module to be implemented such that an observation is carried out by a user, for example through an eyepiece, without digitization.

In conclusion, techniques that allow an image with phase contrast to be illustrated were described. Such techniques can be used in different applications. By way of example, such techniques can be used if the user uses a direct observation of the sample object through an eyepiece, for example of a microscope. Then, the phase contrast is directly visible, for example without the necessity of further digital post-processing. A further field of application relates to the illustration of phase contrast and object structures if orders of diffraction that do not contribute positively to the object contrast are reduced or suppressed by the imaging optical unit of the optical system. Advantages may include, for example, the increased usable dynamic range by means of an already available camera since, for example, orders of diffraction not equipped with information only contribute to an intensity offset. Furthermore, the information is directly physically measured using a detector—and not only subsequently interpreted during a post-processing process, for instance, such as, e.g., the deconvolution by, for example, a probability algorithm (e.g., maximum likelihood approach).

It goes without saying that the features of the embodiments and aspects of the invention described above can be combined with one another. In particular, the features can be used not only in the combinations described but also in other combinations or on their own without departing from the scope of the invention.

By way of example, the digital techniques described herein could be complemented by hardware features in conjunction with conventional phase contrast imaging. By way of example, the techniques described herein can be complemented by optical components such as a DIC prism or a phase-contrast ring. As a result, the phase contrast can be increased. By way of example, the effect of this may be that the so-called HALO effect, which sometimes arises in the Zernike phase contrast, in particular, is effectively reduced by virtue of the ring stop being matched to the phase ring in such a way that the zero order, which is not diffracted by the object, does not lead to destructive interference and does not produce margins at object edges, which, as a rule, makes the evaluation of images more difficult.

The invention claimed is:

1. A method, comprising:
    based on a reference measurement, determining an object transfer function for a sample object,
    based on the object transfer function and further based on an optical transfer function for an optical unit, performing an optimization for finding an optimized illumination geometry, and
    actuating at least one illumination module for illuminating the sample object with the optimized illumination geometry using the optical unit.

2. The method as claimed in claim 1, further comprising:
    performing the reference measurement by actuating the at least one illumination module for illuminating the sample object from different initial illumination geometries and by actuating at least one detector for capturing a plurality of initial images of the sample object associated with the different initial illumination geometries; and
    determining a phase contrast-weighted reference image of the sample object based on the plurality of initial images of the sample object.

3. The method as claimed in claim 2,
    wherein the phase contrast-weighted reference image of the sample object is determined based on a combination of the initial images of the sample object and/or based on a Fourier ptychography analysis and/or based on an iterative Fourier transform algorithm.

4. The method as claimed in claim 2, further comprising:
    placing a start point of the optimization and/or a boundary condition of the optimization based on the phase contrast-weighted reference image.

5. The method as claimed in claim 1,
    wherein the optimization iteratively checks a plurality of images of the sample object in respect of an optimization criterion,
    wherein the plurality of images have been simulated based on the object transfer function and further based on the optical transfer function to produce simulated images, and
    wherein the simulated images are associated with different simulated test illumination geometries.

6. The method as claimed in claim 5,
    wherein the optimization criterion comprises at least one of an image contrast of the simulated images and an object similarity of an image of the sample object in the simulated images with a reference sample object.

7. The method as claimed in claim 5, comprising:
    determining the test illumination geometries based on a weighted superposition of various components of a polynomial series expansion, wherein the polynomial series expansion comprises Zernike polynomials,
    wherein a multiplicity of optical transfer functions are predetermined for the various components of the polynomial series expansion.

8. The method as claimed in claim 1, further comprising:
    determining the optimized illumination geometry based on an assignment between a function that is continuously defined in real space as an optimization variable of the optimization and a multiplicity of discrete illumination elements of the at least one illumination module.

9. The method as claimed in claim 1,
    wherein the optimization comprises a particle swarm algorithm or a grid search algorithm.

10. The method as claimed in claim 1,
    wherein the optical transfer function comprises a four-dimensional transmission cross coefficient matrix or a two-dimensional transmission cross coefficient matrix corresponding to dominant eigenvectors of the four-dimensional transmission cross coefficient matrix.

* * * * *

UNITED STATES PATENT AND TRADEMARK OFFICE
CERTIFICATE OF CORRECTION

PATENT NO. : 11,397,312 B2
APPLICATION NO. : 16/498639
DATED : July 26, 2022
INVENTOR(S) : Diederich et al.

It is certified that error appears in the above-identified patent and that said Letters Patent is hereby corrected as shown below:

On the Title Page

(73) Assignee: Please correct "Cad Zeiss" to read --Carl Zeiss--

Signed and Sealed this
Eighth Day of November, 2022

*Katherine Kelly Vidal*

Katherine Kelly Vidal
*Director of the United States Patent and Trademark Office*